(12) United States Patent
Nagayama

(10) Patent No.: US 9,369,417 B2
(45) Date of Patent: Jun. 14, 2016

(54) ON-VEHICLE APPARATUS, TERMINAL DEVICE, AND INFORMATION TRANSMISSION CONTROL METHOD

(71) Applicant: Alpine Electronics, Inc., Tokyo (JP)

(72) Inventor: Koji Nagayama, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 284 days.

(21) Appl. No.: 13/793,126

(22) Filed: Mar. 11, 2013

(65) Prior Publication Data

US 2013/0282843 A1 Oct. 24, 2013

(30) Foreign Application Priority Data

Apr. 20, 2012 (JP) ................................. 2012-096313

(51) Int. Cl.
*G06F 15/16* (2006.01)
*H04L 12/58* (2006.01)

(52) U.S. Cl.
CPC ...................................... *H04L 51/20* (2013.01)

(58) Field of Classification Search
CPC ................................ H04L 51/20; H04L 51/06
USPC ........................................................ 709/206
See application file for complete search history.

(56) References Cited

U.S. PATENT DOCUMENTS

| | | | | |
|---|---|---|---|---|
| 7,155,335 B2 * | 12/2006 | Rennels | ......................... | 701/117 |
| 8,019,875 B1 * | 9/2011 | Nielsen | .................. | G06Q 10/06 709/226 |
| 8,115,616 B2 * | 2/2012 | Gonzaga | ................. | E05F 15/00 340/457 |
| 8,666,429 B1 * | 3/2014 | Bali | ......................... | H04W 4/02 455/456.1 |
| 8,700,710 B1 * | 4/2014 | Gallagher | .............. | G06Q 50/01 709/204 |
| 8,745,136 B1 * | 6/2014 | Morrison | ............... | G06Q 50/01 705/319 |
| 8,832,567 B1 * | 9/2014 | Jing | ....................... | G06F 3/0486 715/738 |
| 8,856,939 B2 * | 10/2014 | Cai | ...................... | G06F 21/6254 726/26 |
| 8,875,219 B2 * | 10/2014 | Wilson | ................ | G06F 21/6245 713/168 |
| 9,253,623 B2 * | 2/2016 | Wu | ........................ | H04L 61/103 |
| 2009/0325615 A1 * | 12/2009 | McKay | .................... | H04L 63/02 455/466 |
| 2010/0076777 A1 * | 3/2010 | Paretti | ..................... | G06Q 30/02 705/1.1 |
| 2010/0077484 A1 * | 3/2010 | Paretti et al. | ..................... | 726/26 |
| 2010/0262660 A1 * | 10/2010 | Little | ....................... | H04L 67/24 709/206 |
| 2011/0103696 A1 | 5/2011 | Mizuno | | |
| 2012/0116840 A1 * | 5/2012 | Omer | ..................... | G06Q 30/02 705/7.29 |

FOREIGN PATENT DOCUMENTS

| | | |
|---|---|---|
| JP | 2005-084997 | 3/2005 |
| JP | 2009-163670 | 7/2009 |

(Continued)

*Primary Examiner* — Alicia Baturay
(74) *Attorney, Agent, or Firm* — Brinks Gilson & Lione

(57) ABSTRACT

An on-vehicle apparatus system and a terminal device protect personal information and location information readable from message information viewed by others. The on-vehicle apparatus, which is included in a vehicle and which is connected to the terminal device, includes an application for transmitting location information representing a position of the terminal device along with message information, to a message management system, and includes a first area determination unit which determines whether the position of the terminal device represented by the location information is included in a predetermined first area, and a posting controller, which bans assignment of the location information performed before the message information is transmitted to the message management system by the application, when the first area determination unit determines that the position of the terminal device is included in the first area.

15 Claims, 17 Drawing Sheets

(56) References Cited

FOREIGN PATENT DOCUMENTS

| | | |
|---|---|---|
| JP | 2011-035768 | 2/2011 |
| JP | 2011-120214 | 6/2011 |
| JP | 2012-008969 | 1/2012 |

* cited by examiner

FIG. 6

| REGISTRATION LOCATION INFORMATION | SECOND AREA (CLOSEST) | FIRST AREA (NEIGHBORING) | THIRD AREA (NEAR) |
|---|---|---|---|
| (x1, y1) | ADDRESS $A_1$ TO $A_n$ | ADDRESS $D_1$ TO $D_n$ | ADDRESS $G_1$ TO $G_n$ |
| (x2, y2) | ADDRESS $B_1$ TO $B_n$ | ADDRESS $E_1$ TO $E_n$ | ADDRESS $H_1$ TO $H_n$ |
| (x3, y3) | ADDRESS $C_1$ TO $C_n$ | ADDRESS $F_1$ TO $F_n$ | ADDRESS $I_1$ TO $I_n$ |

# ON-VEHICLE APPARATUS, TERMINAL DEVICE, AND INFORMATION TRANSMISSION CONTROL METHOD

PRIORITY CLAIM

This application claims the benefit of Japanese Patent Application No. 2012-096313 filed on Apr. 20, 2012, which is incorporated by reference herein in its entirety.

BACKGROUND

1. Field of the Invention

The present invention relates to an on-vehicle apparatus system which includes a terminal device, including an application for transmitting message information to a message management system, such as an SNS system, which provides social networking service (SNS) including Facebook® and Twitter®, which receives the message information from the terminal device through a certain network (the Internet, for example), and which allows other terminal devices to view the message information.

2. Description of the Related Art

In general, communication systems and communication apparatuses which are capable of transmitting and receiving messages, including positional information, have been proposed (Japanese Unexamined Patent Application Publication No. 2005-84997, for example). In such a communication system, when detecting a request for transmitting an electronic mail including positional information, a navigation device on a transmission side writes, in a header portion of the electronic mail, a character or a symbol representing that the positional information is included and transmits the electronic mail. When a navigation device on a reception side performs an analysis process on the header portion of the electronic mail, the positional information may be obtained from the character, the symbol, or the like written in the header portion of the electronic mail.

According to the communication system disclosed in Japanese Unexamined Patent Application Publication No. 2005-84997, in response to a request for creating an electronic mail issued by a user, a determination as to whether positional information is to be added to an electronic mail being created may be made while a mail creation screen used to create electronic mails is displayed in a display unit. By this, when the user determines that the positional information is to be added to the electronic mail, the electronic mail including the positional information added thereto may be transmitted. Accordingly, the reception side, which receives the electronic mail, may obtain the positional information after checking whether the positional information has been added and performing an appropriate process, and furthermore, the reception side may utilize the positional information.

In the communication system disclosed in Japanese Unexamined Patent Application Publication No. 2005-84997, an electronic mail is transmitted after a transmission destination of the electronic mail is specified. However, message information supplied to the message management system, such as SNS, is transmitted to an unspecified number of people in practice in many cases. Therefore, the user's home or location thereof, may be identified, or action patterns of the user are expected from content of the message information and history of location information, for example, which may constitute undesirable disclosure of personal information is becoming a serious concern.

SUMMARY

Embodiments of the present invention have been made in view of the above to provide an on-vehicle apparatus system capable of appropriately protecting personal information readable from message information and location information, which may be viewed by other users, and further provides an on-vehicle apparatus and a terminal device.

An on-vehicle apparatus according to embodiments of the present invention is included in a vehicle and connected to a terminal device including an application for transmitting location information representing a position of the terminal device together with message information, to a message management system which receives the message information from the terminal device on a predetermined network, and provides the received message information to other terminal devices.

The on-vehicle apparatus includes a first area determination unit configured to determine whether the position of the terminal device represented by the location information is included in a predetermined first area, and includes a posting controller configured to ban assignment of the location information before the message information is transmitted to the message management system performed by the application, when the first area determination unit determines that the position of the terminal device is included in the first area.

With this configuration, the terminal device is controlled such that, when the message information to which the location information representing the position of the terminal device is assigned is intended to be transmitted to the message management system, if it is determined that the position of the terminal device represented by the location information is included in the predetermined first area, the assignment of the location information to the message information to be transmitted to the message management system is banned. By this, since the location information in the first area is not assigned to the message information to be transmitted to the message management system, a location where the message information is issued is prevented from being specified by the other devices.

The on-vehicle apparatus according to the present invention may further include a second area determination unit configured to determine whether the position of the terminal device represented by the location information is included in a second area which is included in the first area and which is narrower than the first area. The posting controller may ban transmission of the message information to which the location information is not allowed to be assigned to the message management system, when it is determined that the position of the terminal device represented by the location information is included in the second area.

With this configuration, the terminal device is controlled such that, when the message information to which the location information is assigned is intended to be transmitted to the message management system, if it is determined that the position of the terminal device represented by the location information is included in the second area which is included in the first area and which is narrower than the first area, transmission of the message information to which the location information is not allowed to be assigned to the message management system is banned. Accordingly, since the message information is not transmitted to the message management system in the second area, the message information and the location information of the second area are prevented from being viewed by the other devices.

The on-vehicle apparatus according to the present invention may further include a third area determination unit configured to determine whether the position of the terminal device represented by the location information is included in a third area which is a predetermined range located outside the first area, and a selection prompting unit configured to determine whether the location information is to be assigned to the message information before the message information is transmitted to the message management system, when the third area determination unit determines that the position of the terminal device represented by the location information is included in the third area. The posting controller may ban, when it is determined that the location information is not to be assigned to the message information, assignment of the location information before the message information is transmitted to the message management system.

With this configuration, the terminal device is controlled such that, when the message information to which the location information is assigned is intended to be transmitted to the message management system, if it is determined that the position of the terminal device represented by the location information is included in the third area which a certain range outside the first area, a determination as to whether the location information is to be assigned to the message information before the message information is transmitted to the message management system may be prompted. The terminal device is further controlled such that, when a user determines that the location information is not to be assigned to the message information, assignment of the location information to the message information to be transmitted to the message management system is banned. By this, since the location information in the third area is also not assigned to the message information to be transmitted to the message management system in accordance with the determination made by the user, a location where the message information is issued is prevented from being specified by the other devices.

In the on-vehicle apparatus according to the present invention, the selection prompting unit may include a display controller configured to display, in a display unit of the on-vehicle apparatus, a selection screen used to determine whether the location information is to be assigned to the message information before the message information is transmitted to the message management system, when the third determination unit determines that the position of the terminal device is included in the third area.

With this configuration, when the message information to which the location information is assigned is intended to be transmitted to the message management system, if it is determined that the position of the terminal device represented by the location information is included in the third area, the selection screen used to determine whether the location information is to be assigned to the message information is displayed in the display unit of the on-vehicle apparatus. Accordingly, the determination as to whether the location information is to be assigned to the message information may be more reliably made with ease by checking the selection screen by the user.

In the on-vehicle apparatus according to the present invention, the first area may have a polygonal shape including a predetermined registration location.

With this configuration, since the first area is configured as a polygonal area including the predetermined registration location, a position of the predetermined registration location may be prevented from being specified by the other terminal devices using history of location information out of the first area.

In the on-vehicle apparatus according to the present invention, the first area may have a circle shape including a predetermined registration location.

With this configuration, the first area is configured as a circle area including the predetermined registration location, and a position of the registration location which is personal information is not assigned to the message information as location information. Accordingly, the position of the predetermined registration location may be prevented from being specified using the message information by the other terminal devices. Furthermore, the first area may be a circle area including the registration location at the center.

In the on-vehicle apparatus according to the present invention, the first area may be a zone represented by addresses included in a certain region.

With this configuration, the first area is a zone represented by addresses in a certain area, and the location information is not assigned to the message information when the position of the terminal device is included in an area represented by the addresses in the certain region. Accordingly, the addresses in the certain region may be prevented from being specified using the message information by the other terminal devices.

In the on-vehicle apparatus according to the present invention, at least one of the second and third areas may have a shape the same as that of the first area.

With this configuration, since at least one of the second and third areas has a shape the same as that of the first area, the position of the predetermined registration location or the addresses in the certain region may be prevented from being specified using the message information by the other terminal devices in a wider range.

The on-vehicle apparatus according to the present invention may further include a vehicle position detector configured to detect a position of the vehicle. The position of the vehicle may be used as the position of the terminal device represented by the location information.

With this configuration, since the position of the vehicle is used as a position of the terminal device represented by the location information, the position of the vehicle detected by the vehicle position detector may be used for a determination as to whether the terminal device is included in one of the first to third areas.

An on-vehicle apparatus system according to the present invention includes a terminal device including an application for transmitting location information representing a position of the terminal device together with message information to a message management system which receives the message information from the terminal device on a predetermined network and provides the received message information to other terminal devices, and includes an on-vehicle apparatus which is included in a vehicle and which is connected to the terminal device. The on-vehicle apparatus includes an area determination unit configured to determine whether the position of the terminal device represented by the location information is included in a predetermined area, and a posting controller configured to ban assignment of the location information before the message information is transmitted to the message management system by the application, when the area determination unit determines that the position of the terminal device is included in the area.

With this configuration, when it is determined that the position of the terminal device represented by the location information is included in the predetermined area, assignment of the location information to the message information to be transmitted to the message management system is banned. By this, since the location information in the area is not assigned to the message information to be transmitted to the message management system, a location where the message information is issued is prevented from being specified by the other devices.

An on-vehicle apparatus according to the present invention is connected to a terminal device including an application for transmitting location information representing a position of the terminal device together with message information to a message management system which receives the message information from the terminal device on a predetermined network and provides the received message information to other terminal devices, and is included in a vehicle. The on-vehicle apparatus includes an area determination unit configured to determine whether the position of the terminal device represented by the location information is included in a predetermined area, a selection prompting unit configured to prompt a determination as to whether the location information is to be assigned to the message information before the message information is transmitted to the message management system, when the area determination unit determines that the position of the terminal device represented by the location information is included in the area, and a posting controller configured to cause the terminal device to ban assignment of the location information before the message information is transmitted to the message management system, when it is determined that the location information is not to be assigned to the message information.

With this configuration, the terminal device is controlled such that, when the message information to which the location information is assigned is intended to be transmitted to the message management system, if it is determined that the position of the terminal device represented by the location information is included in the predetermined area, a determination as to whether the location information is to be assigned to the message information before the message information is transmitted to the message management system may be prompted. The terminal device is further controlled such that, when the user determines that the location information is not to be assigned to the message information, assignment of the location information to the message information to be transmitted to the message management system is banned. By this, since the location information is not assigned to the message information to be transmitted to the message management system in accordance with the determination made by the user, a location where the message information is issued is prevented from being specified by the other devices.

An on-vehicle apparatus according to the present invention is connected to a terminal device including an application for transmitting location information representing a position of the terminal device together with message information to a message management system which receives the message information from the terminal device on a predetermined network and provides the received message information to other terminal devices, and is included in a vehicle. The on-vehicle apparatus includes an area determination unit configured to determine whether the position of the terminal device represented by the location information is included in a predetermined area, and a posting controller configured to ban transmission of the message information and the location information to the message management system when the area determination unit determines that the position of the terminal device represented by the location information is included in the area.

With this configuration, the terminal device is controlled such that, when the message information to which the location information is assigned is intended to be transmitted to the message management system, if it is determined that the position of the terminal device represented by the location information is included in the predetermined area, transmission of the message information and the location information to the message management system is banned. Accordingly, since the message information is not transmitted to the message management system in the predetermined area, the message information and the location information of the predetermined area are prevented from being viewed by the other devices.

An on-vehicle apparatus system according to the present invention includes an application for transmitting location information representing a position of the terminal device together with message information to a message management system which receives the message information from the terminal device on a predetermined network and provides the received message information to other terminal devices. The on-vehicle apparatus includes an area determination unit configured to determine whether the position of the terminal device represented by the location information is included in a predetermined area, and a posting controller configured to ban assignment of the location information before the message information is transmitted to the message management system by the application, when the area determination unit determines that the position of the terminal device is included in the area.

With this configuration, when it is determined that the position of the terminal device (a position of a vehicle including the on-vehicle apparatus) represented by the location information is included in the predetermined area, assignment of the location information to the message information to be transmitted to the message management system is banned. By this, since the location information in the area is not assigned to the message information to be transmitted to the message management system, a location where the message information is issued is prevented from being specified by the other devices.

An on-vehicle apparatus according to the present invention includes an application for transmitting location information representing a position of the terminal device together with message information to a message management system which receives the message information from the terminal device on a predetermined network and provides the received message information to other terminal devices. The on-vehicle apparatus includes an area determination unit configured to determine whether the position of the terminal device represented by the location information is included in a predetermined area, a selection prompting unit configured to prompt a determination as to whether the location information is to be assigned to the message information before the message information is transmitted to the message management system, when the area determination unit determines that the position of the terminal device represented by the location information is included in the area, and a posting controller configured to ban assignment of the location information before the message information is transmitted to the message management system, when it is determined that the location information is not to be assigned to the message information.

With this configuration, when the message information to which the location information is assigned is intended to be transmitted to the message management system, if it is determined that the position of the terminal device (a position of a vehicle including the on-vehicle apparatus) represented by the location information is included in the predetermined area, a determination as to whether the location information is to be assigned to the message information before the message information is transmitted to the message management system may be prompted. When the user determines that the location information is not to be assigned to the message information, assignment of the location information to the message information to be transmitted to the message management system is banned. By this, since the location information is not assigned to the message information to be transmitted to the message management system in accordance with the determination made by the user, a location where the message information is issued is prevented from being specified by the other devices.

An on-vehicle apparatus according to the present invention includes an application for transmitting location information representing a position of the terminal device together with message information to a message management system which receives the message information from the terminal device on a predetermined network and provides the received message information to other terminal devices. The on-vehicle apparatus includes an area determination unit configured to determine whether the position of the terminal device represented by the location information is included in a predetermined area, and a posting controller configured to ban transmission of the message information and the location information to the message management system when the area determination unit determines that the position of the terminal device represented by the location information is included in the area.

With this configuration, when the message information to which the location information representing a position of the terminal device (a position of a vehicle including the on-vehicle apparatus) is assigned is intended to be transmitted to the message management system, if it is determined that the position of the terminal device represented by the location information is included in the predetermined area, transmission of the message information and the location information to the message management system is banned. Accordingly, since the message information is not transmitted to the message management system in the predetermined area, the message information and the location information of the predetermined area are prevented from being viewed by the other devices.

A terminal device according to the present invention includes an application for transmitting location information representing a position of a terminal device together with message information to a message management system which receives the message information from the terminal device on a predetermined network and provides the received message information to other terminal devices. The terminal device includes an area determination unit configured to determine whether the position of the terminal device represented by the location information is included in a predetermined area, and a posting controller configured to ban assignment of the location information before the message information is transmitted to the message management system by the application, when the area determination unit determines that the position of the terminal device is included in the area.

With this configuration, when it is determined that the position of the terminal device represented by the location information is included in the predetermined area, assignment of the location information to the message information to be transmitted to the message management system is banned. By this, since the location information in the area is not assigned to the message information to be transmitted to the message management system, a location where the message information is issued is prevented from being specified by the other devices.

A terminal device according to the present invention includes an application for transmitting location information representing a position of the terminal device together with message information to a message management system which receives the message information from the terminal device on a predetermined network and provides the received message information to other terminal devices. The terminal device includes an area determination unit configured to determine whether the position of the terminal device represented by the location information is included in a predetermined area, a selection prompting unit configured to prompt a determination as to whether the location information is to be assigned to the message information before the message information is transmitted to the message management system, when the area determination unit determines that the position of the terminal device represented by the location information is included in the area, and a posting controller configured to ban assignment of the location information at the time of transmission of the message information to the message management system when it is determined that the location information is not to be assigned to the message information.

With this configuration, when the message information to which the location information is assigned is intended to be transmitted to the message management system, if it is determined that the position of the terminal device represented by the location information is included in the predetermined area, a determination as to whether the location information is to be assigned to the message information before the message information is transmitted to the message management system may be prompted. When the user determines that the location information is not to be assigned to the message information, assignment of the location information to the message information to be transmitted to the message management system is banned. By this, since the location information is not assigned to the message information to be transmitted to the message management system in accordance with the determination made by the user, a location where the message information is issued is prevented from being specified by the other devices.

A terminal device according to the present invention includes an application for transmitting location information representing a position of the terminal device together with message information to a message management system which receives the message information from the terminal device on a predetermined network and provides the received message information to other terminal devices. The terminal device includes an area determination unit configured to determine whether the position of the terminal device represented by the location information is included in a predetermined area, and a posting controller configured to ban transmission of the message information and the location information to the message management system when the area determination unit determines that the position of the terminal device represented by the location information is included in the area.

With this configuration, when the message information to which the location information representing a position of the terminal device is assigned is intended to be transmitted to the message management system, if it is determined that the position of the terminal device represented by the location information is included in the predetermined area, transmission of the message information and the location information to the message management system is banned. Accordingly, since the message information is not transmitted to the message management system in the predetermined area, the message information and the location information of the predetermined area are prevented from being viewed by the other devices.

According to an on-vehicle apparatus system, an on-vehicle apparatus, and a terminal device, when message information to which location information representing a position of a terminal device is assigned is intended to be transmitted to a message management system, if it is determined that the position of the terminal device represented by the location information is included in a predetermined first area, the assignment of the location information to the message information to be transmitted to the message management system is banned. By this, since the location information in a first area is not assigned to the message information to be transmitted to the message management system, a location where the message information is issued is prevented from being specified by the other devices. Accordingly, when the message information and the location information are viewed, personal information readable from the message information and the location information to be viewed may be more reliably protected.

BRIEF DESCRIPTION OF THE DRAWINGS

FIG. 6 is a table of areas stored in a storage unit of the on-vehicle apparatus illustrated in FIG. 1;

DETAILED DESCRIPTION

Hereinafter, embodiments of the present invention will be described with reference to the accompanying drawings.

Figure 1:
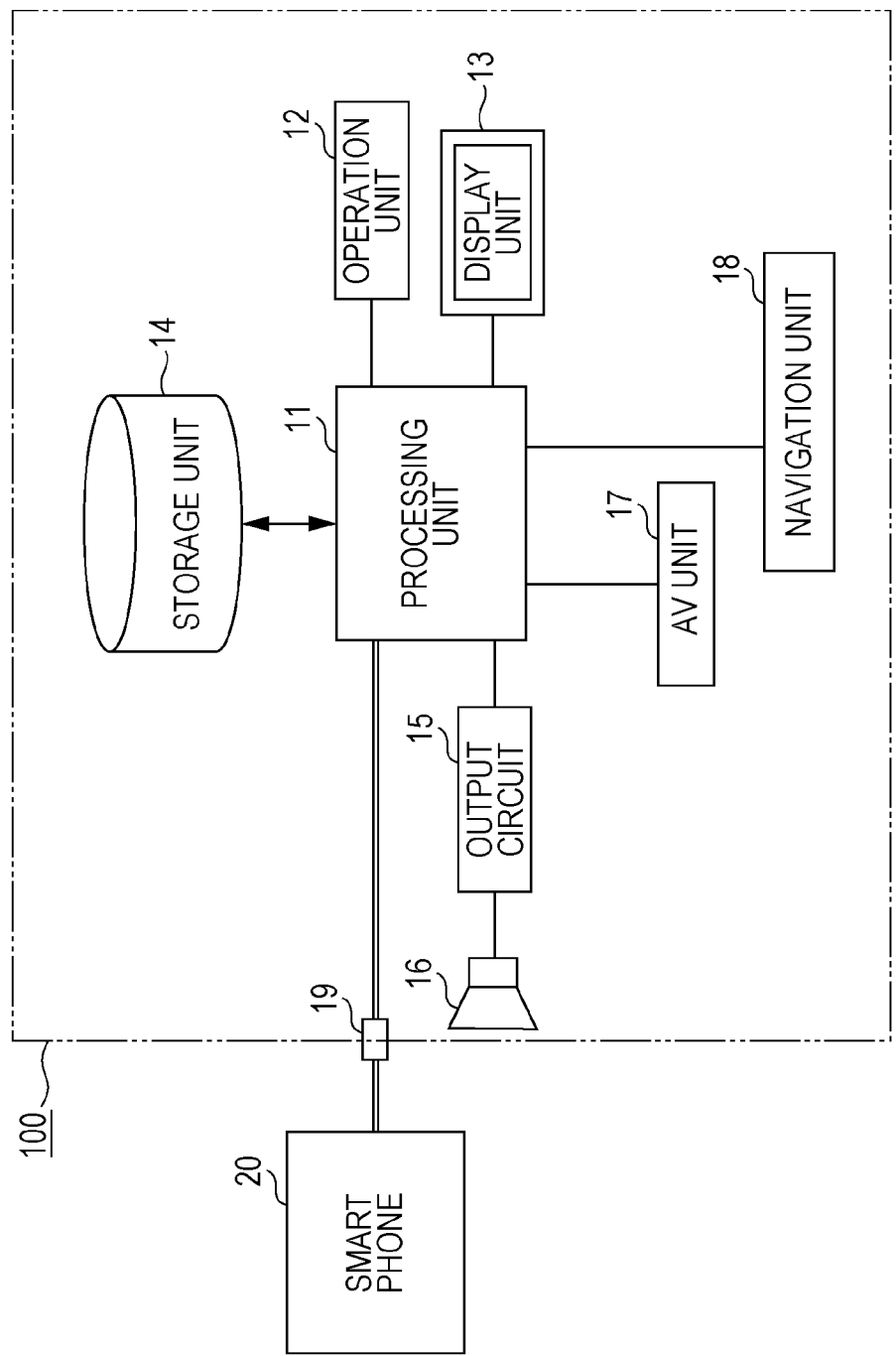
FIG. 1 is a block diagram illustrating a configuration of an on-vehicle apparatus and a smart phone (terminal device) which are included in an on-vehicle apparatus system according to an embodiment of the present invention.

An on-vehicle apparatus system, an on-vehicle apparatus, and a smart phone (a terminal device) according to the embodiments of the present invention are configured as illustrated in FIG. 1.

In FIG. 1, an on-vehicle apparatus 100 included in the on-vehicle apparatus system includes a connector 19 for external connection. A smart phone 20 is connected to the connector 19 by a cable. The on-vehicle apparatus 100 includes a processing unit 11 including a computer unit (a CPU, for example). To the processing unit 11, an audio-video unit (AV unit) 17 which reproduces music and videos from a disc medium such as a CD or a DVD and a navigation unit 18 which performs vehicle navigation are connected. In addition, to the processing unit 11, a storage unit 14 (a hard disk, for example) which stores information used by the AV unit 17, information (map information, facility information, and a storage table described below, for example) used by the navigation unit 18, and information used by other various processes is connected. Furthermore, the processing unit 11 is installed in a vehicle, and a display unit 13 including an LCD, an operation unit 12 including an operation button operable by a user and a touch panel included in the display unit 13, and an output circuit 15 which supplies audio signals to a speaker 16 installed in the vehicle, are connected to the processing unit 11.

The connector 19 connected to the smart phone 20 by the cable may be connected to the processing unit 11, however, other forms of connection may be used, such as a wireless connection. The processing unit 11 is capable of communicating with the smart phone 20 through the cable and the connector 19. The smart phone 20 includes an application which executes a navigation process which is similar to a vehicle navigation process executed by the navigation unit 18 of the on-vehicle apparatus 100. Furthermore, the smart phone 20 includes a plurality of applications such as an information search application, a message posting application (an SNS application, for example), and games.

The smart phone 20 executes various control operations and processes in accordance with various types of application software. For example, when an SNS application of the smart phone 20 is activated, a communication unit, not shown, installed in the smart phone 20 becomes capable of communicating with an SNS system which provides SNS such as Twitter® on the Internet through a mobile communication network. The SNS system is capable of functioning as a message management system which receives message information from a terminal device and provides the message information to other terminal devices so that the other terminal devices may view the message information on the Internet. Furthermore, a display unit 201 (refer to FIG. 2) of the smart phone 20 is constituted by an LCD or the like and displays various information obtained by processes performed by the smart phone 20. Furthermore, the smart phone 20 may be operated by a touch panel or the like integrally disposed on the display unit 201 in accordance with user's operations (such as operations performed by a finger on the touch panel).

Furthermore, the smart phone 20 includes a GPS unit, not shown, which detects a position (a latitude (X) and a longitude (Y), for example) of the smart phone 20. When the smart phone 20 uses the SNS application described above, the position of the smart phone 20 obtained by the GPS unit, not shown, may be assigned as location information to message information to be posted to the SNS system. Note that a setting whether location information is assigned to message information to be posted to an SNS system may be performed by a user in advance. A state in which the smart phone 20 assigns location information to message information is referred to as a "geotag ON state". On the other hand, a state in which the smart phone 20 does not assign location information to message information to be posted to an SNS system is referred to as a "geotag OFF state".

Figure 2:
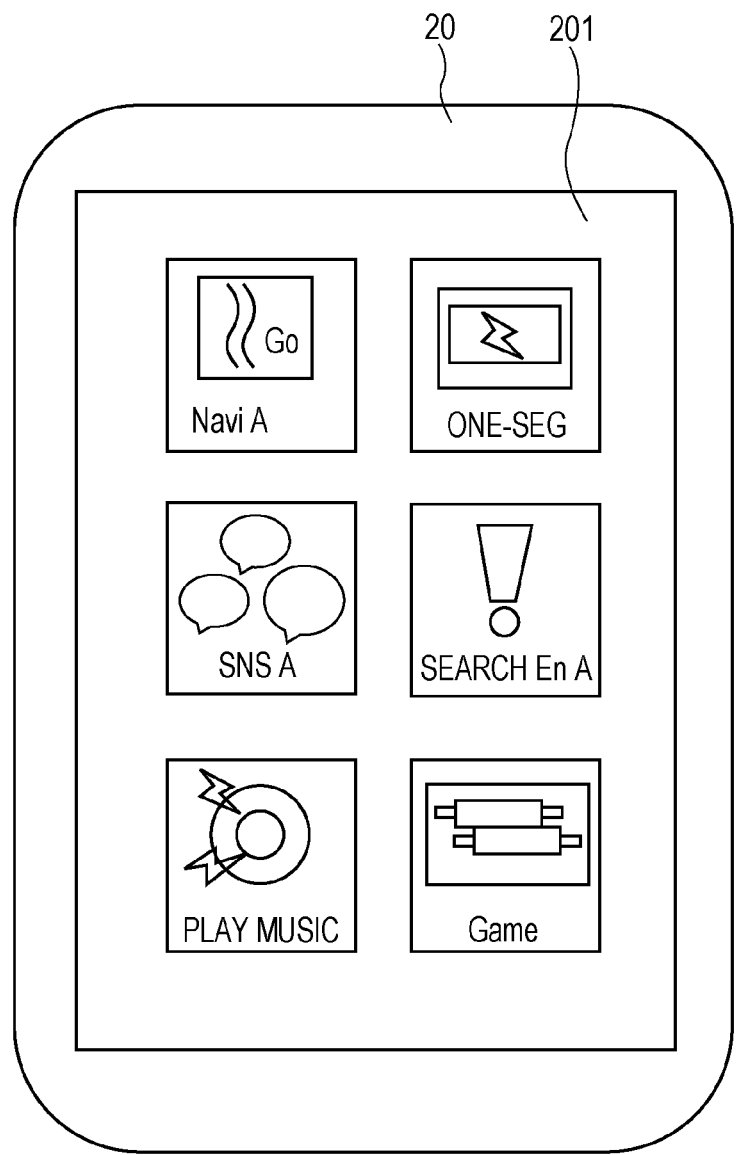
FIG. 2 is a diagram illustrating a home screen of the smart phone illustrated in FIG. 1.

The smart phone 20 causes the display unit 201 to display a list of icon buttons used to activate applications in a home screen as illustrated in FIG. 2. When an SNS application (an icon button "SNS A" in the home screen illustrated in FIG. 2, for example) for utilizing an SNS system is activated, transmission (posting) of message information to the SNS system is enabled. The on-vehicle apparatus 100 connected to the smart phone 20 performs control so that message information and location information are posted by the smart phone 20 in accordance with a procedure of a process illustrated in FIGS. 3A and 3B, for example.

Figure 3A:
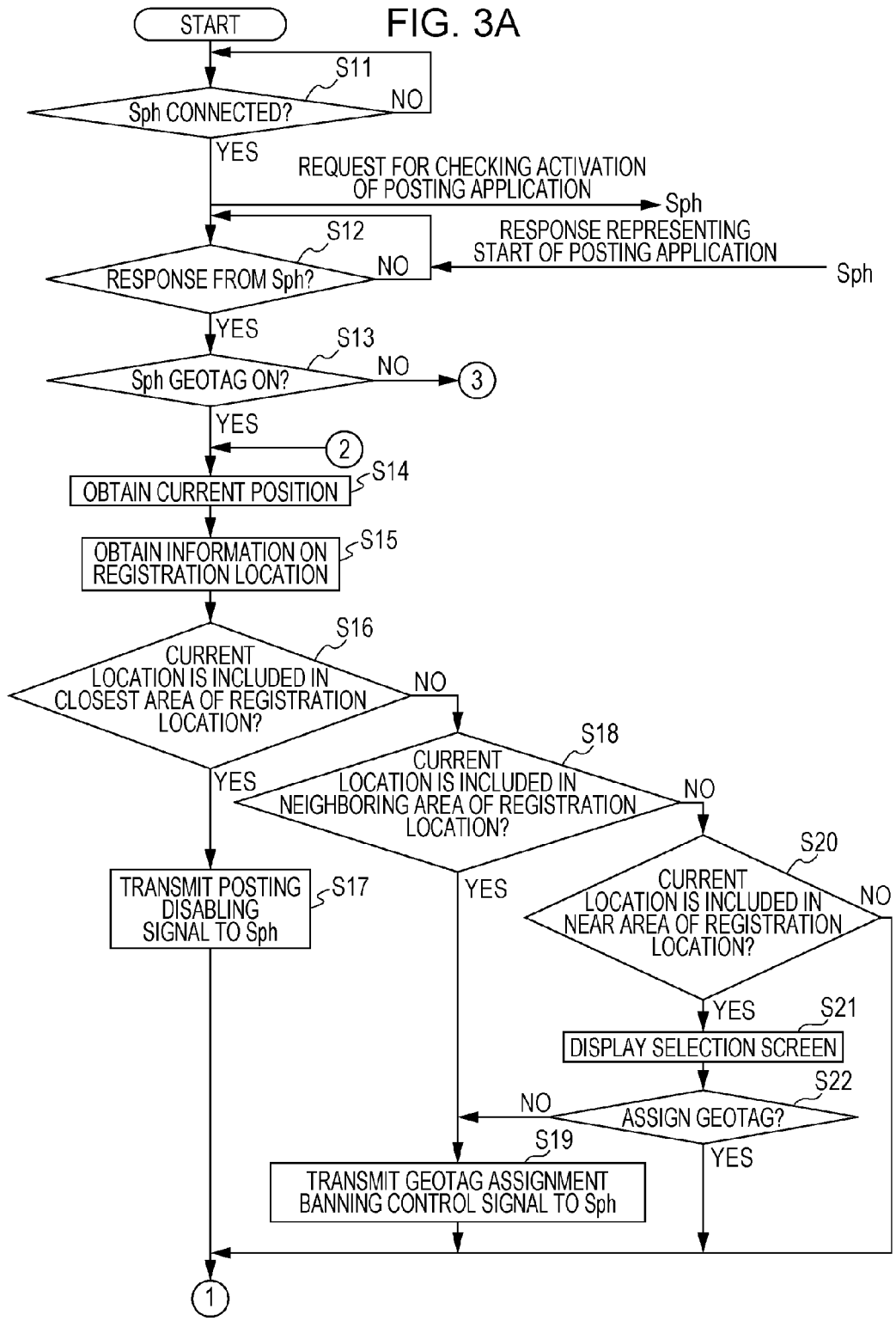
FIG. 3A is a flowchart (part 1) illustrating a process performed by the on-vehicle apparatus connected to the smart phone illustrated in FIG. 1.
Figure 3B:
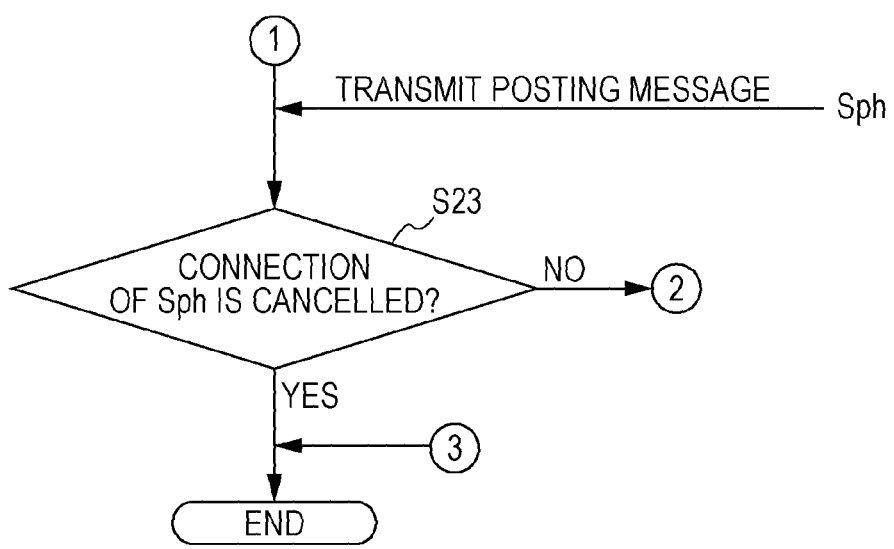
FIG. 3B is a flowchart (part 2) illustrating the process performed by the on-vehicle apparatus connected to the smart phone illustrated in FIG. 1.

As illustrated in FIG. 3A, the processing unit 11 of the on-vehicle apparatus 100 determines whether the smart phone 20 (Sph, FIG. 3A) is connected through the connector 19 of the on-vehicle apparatus 100 (in step S11). When it is determined that the smart phone 20 is connected to the on-vehicle apparatus 100 through the connector 19 (that is, when the determination is affirmative in step S11), the processing unit 11 transmits a check request signal for checking whether a posting application (SNS application A) is activated to the smart phone 20. Thereafter, the processing unit 11 confirms transmission of a posting application start response signal representing that the posting application is activated supplied from the smart phone 20 (in step S12). By this, when the start response signal representing that the posting application (SNS application A) is started is transmitted from the smart phone 20 (that is, when the determination is affirmative in step S12), the processing unit 11 determines whether the smart phone 20 is in a geotag ON state (in step S13).

When it is determined that the smart phone 20 is in the geotag ON state in step S13 (that is, when the determination is affirmative in step S13), the processing unit 11 obtains a current position of an own vehicle (in step S14: a vehicle position detector). Specifically, the processing unit 11 obtains a current position of the own vehicle by a GPS unit, not shown, included in the on-vehicle apparatus 100 as own vehicle position information. The processing unit 11 obtains information on a registration location determined by the user in advance (registration location information) from the storage unit 14 (in step S15). Note that, although the processing unit 11 obtains the current position of the own vehicle in step S14, the processing unit 11 may obtain location information by the GPS unit, not shown, included in the connected smart phone 20.

Figure 4:
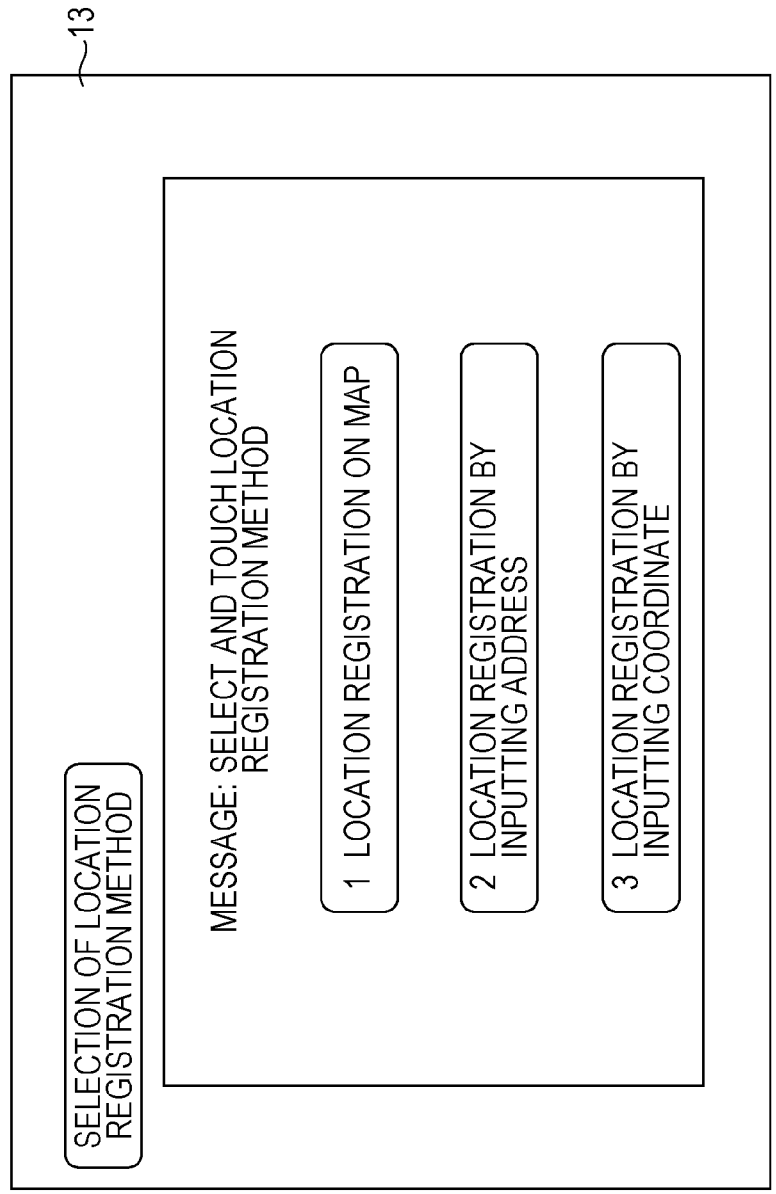
FIG. 4 is a diagram illustrating a location registration selection screen displayed in a display unit of the on-vehicle apparatus illustrated in FIG. 1.
Figure 5:
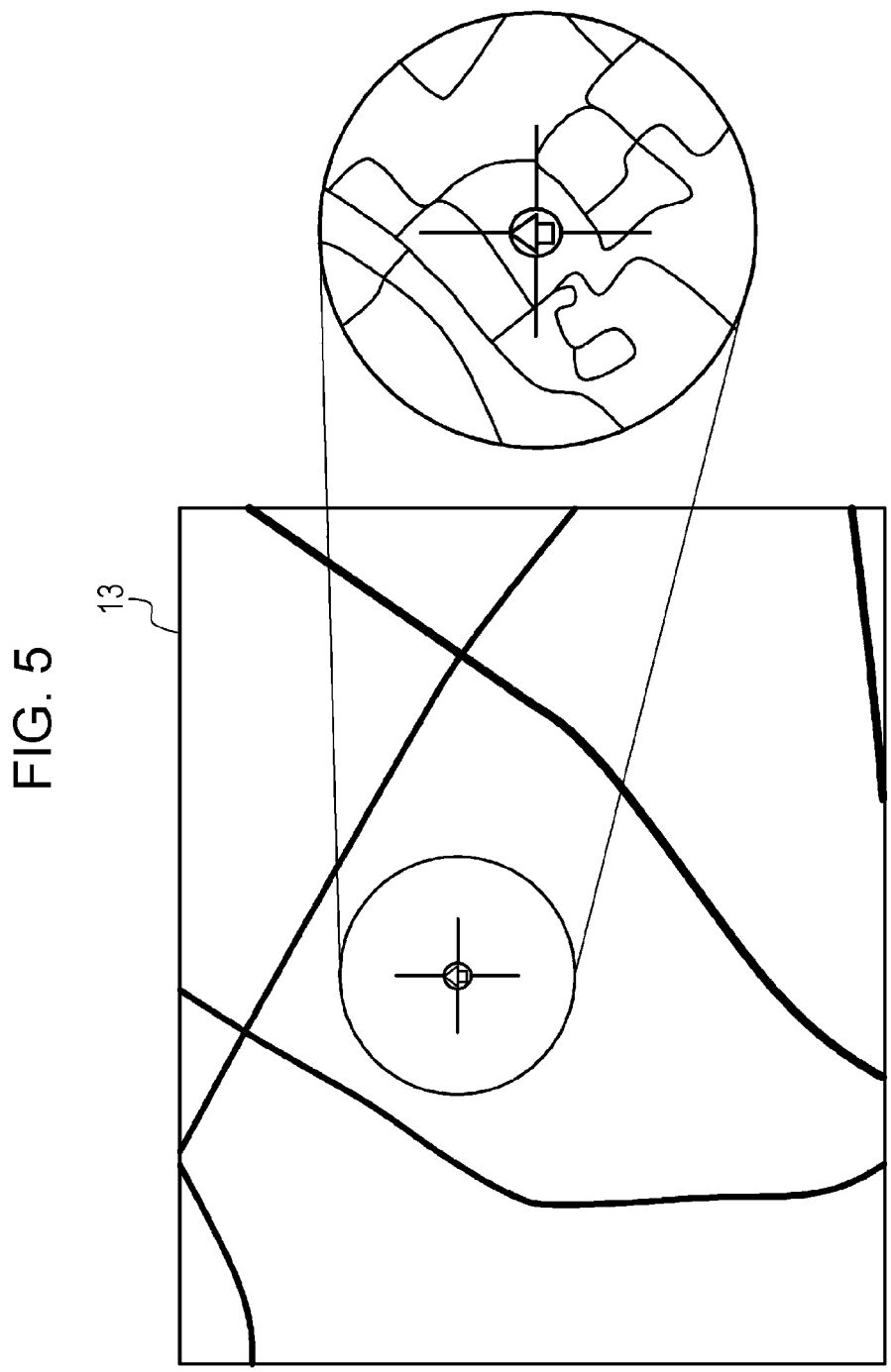
FIG. 5 is a diagram illustrating a case where a location is registered in the on-vehicle apparatus illustrated in FIG. 1.

Examples of the registration location described above include a user's home, a parking area of the own vehicle, an office of the user, and the like which are not desired to be known by others. The registration location may be set in advance by displaying a location registration method selection screen in the display unit 13 as illustrated in FIG. 4 and causing the user to select one of options. Specifically, as examples of a method for registering registration location, the user touches a location to be registered on map information (MAP) displayed in the display unit 13 using the operation unit 12 included in the display unit 13 or the user directly inputs an address of a location to be registered, for example. As described above, when a position of the user's home is selected as a location in which personal information is prevented from being leaked, the position of the user's home is set as a registration location as illustrated in FIG. 5 and a circle area (second area) which spreads from the registration location in an even radius is set.

Figure 7:
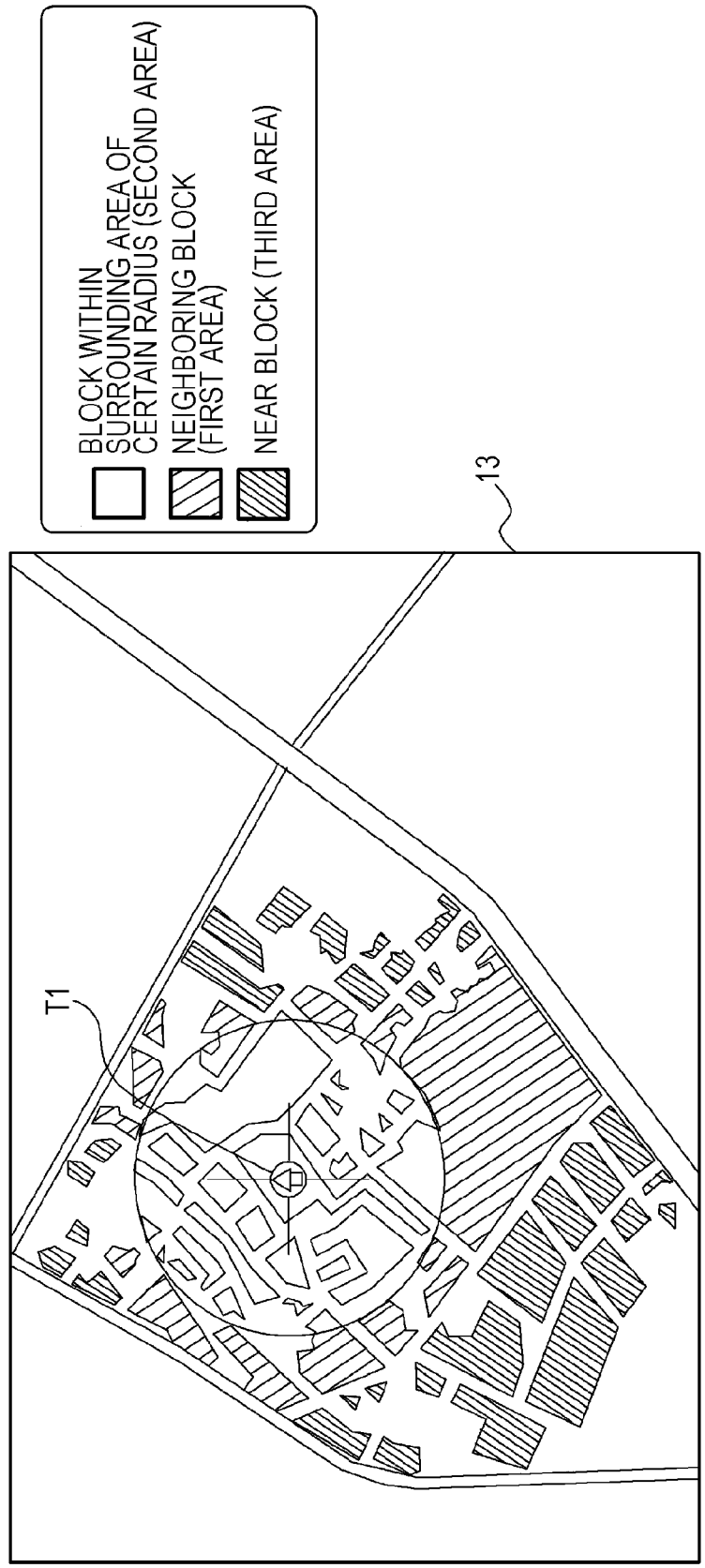
FIG. 7 is a diagram (part 1) illustrating a registration location and zoning displayed in the display unit of the on-vehicle apparatus illustrated in FIG. 1.

Furthermore, the storage unit 14 of the on-vehicle apparatus 100 stores a table of various areas illustrated in FIG. 6. For example, when a location to be registered is selected by the user and stored in the storage unit 14, the processing unit 11 searches for and stores addresses of areas relative to location information ((x1, y1), for example) of the registered location. Accordingly, the processing unit 11 displays the registration location and the divided areas in the display unit 13 of the on-vehicle apparatus 100 as illustrated in FIG. 7 in accordance with the location information of the registration location and the table which stores information on the areas (for example, addresses A1 to An) relative to the location information of the registration location.

The areas described above correspond to divided three areas. The divided areas include a first area (neighboring block) including the registration location, a second area (closest block) which is included in the first area, which is smaller than the first area, and which includes the registration location, and a third area (near block) which is a range outside the first area by a certain distance. More specifically, as illustrated in FIG. 7, the first area (neighboring block) is formed outside the second area (closest block) which has a circle shape including the user's home serving as the registration location at the center and the third area (near block) is formed outside the first area.

Figure 8:
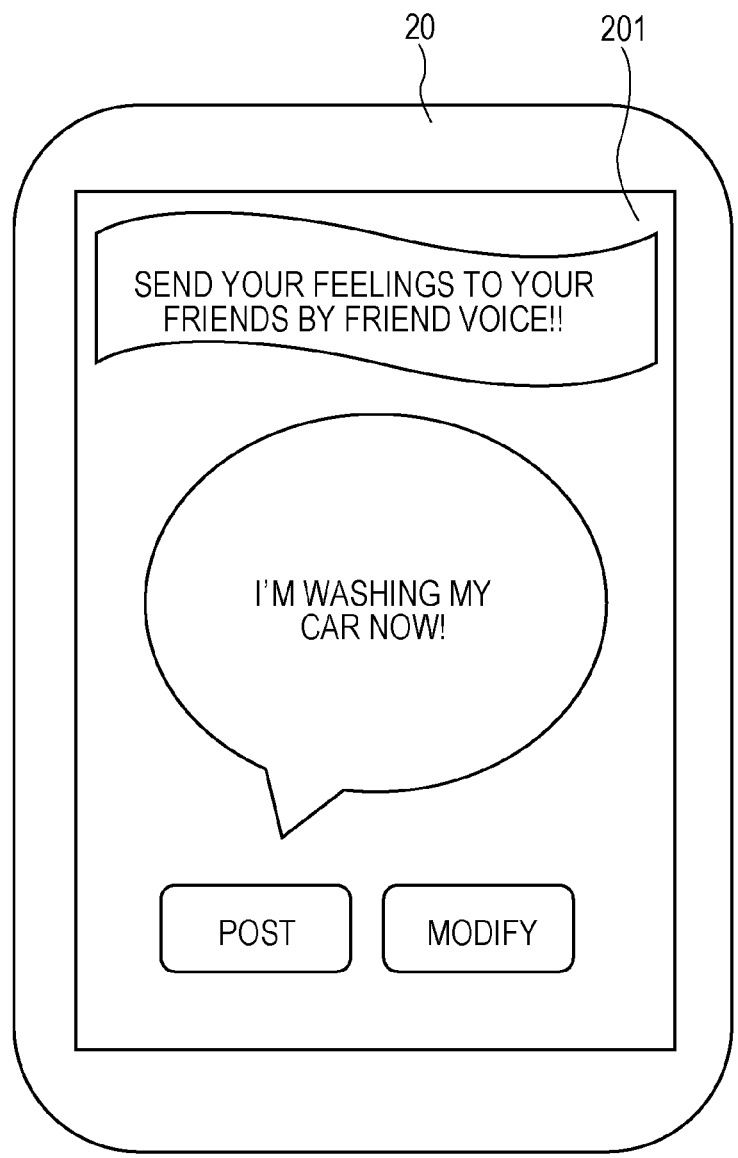
FIG. 8 is a diagram illustrating a posting screen (part 1) of an SNS application of the smart phone illustrated in FIG. 1.
Figure 9:
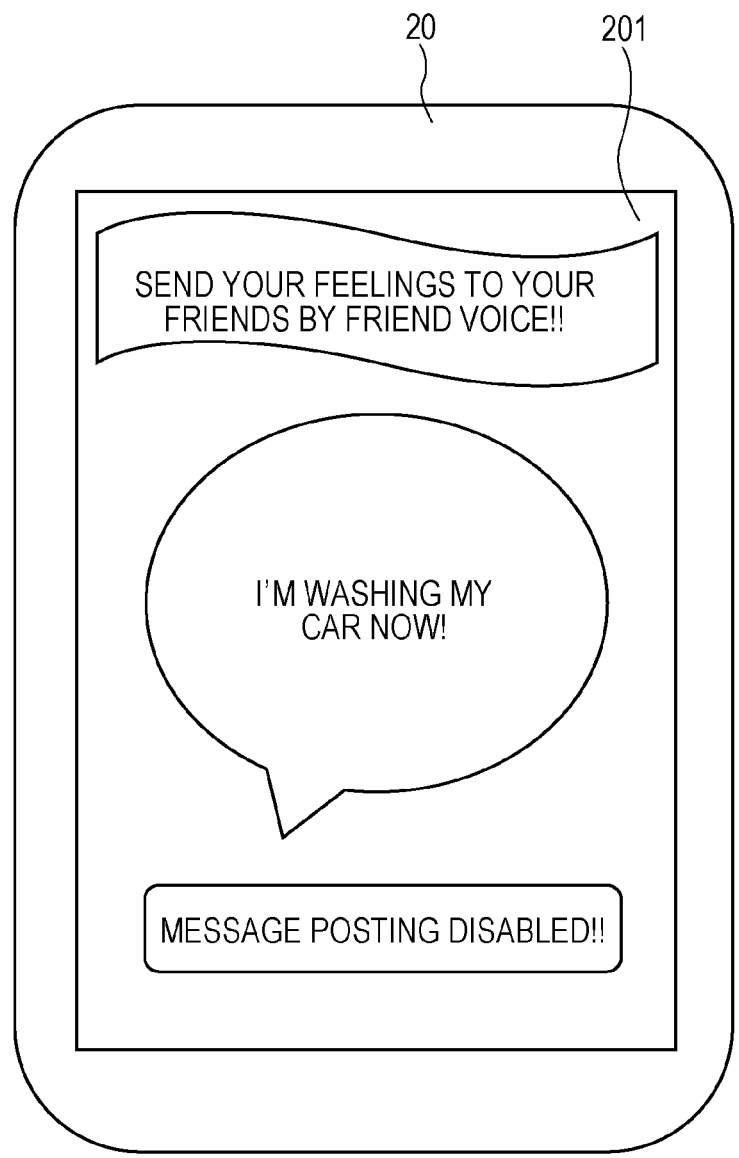
FIG. 9 is a diagram illustrating a posting screen (part 2) of the SNS application of the smart phone illustrated in FIG. 1.

Referring back to FIG. 3A, the processing unit 11 determines whether the current position (a position of the smart phone 20 or the own vehicle) obtained in step S14 is included in the second area including the registration location obtained in step S15 (in step S16: a second area determination unit). Thereafter, when it is determined that the position represented by the location information of the smart phone 20 obtained in step S14 is included in the second area (that is, when the determination is affirmative in step S16), the processing unit 11 transmits a posting disabling signal for disabling transmission of message information and assignment of location information to the message information (in step S17: a posting controller). More specifically, when a position represented by the location information of the smart phone 20 obtained in step S14 corresponds to a registration location T1 illustrated in FIG. 7 (that is, when the determination is affirmative in step S16), for example, the processing unit 11 transmits the posting disabling signal to the smart phone 20. By this, when the user inputs message information in the display unit 201 of the smart phone 20 as illustrated in FIG. 8, for example, a warning message representing that posting of the message information is disabled is displayed instead of a posting button and a modification button as illustrated in FIG. 9. By this, the message information is prevented from being posted by the user.

Figure 10:
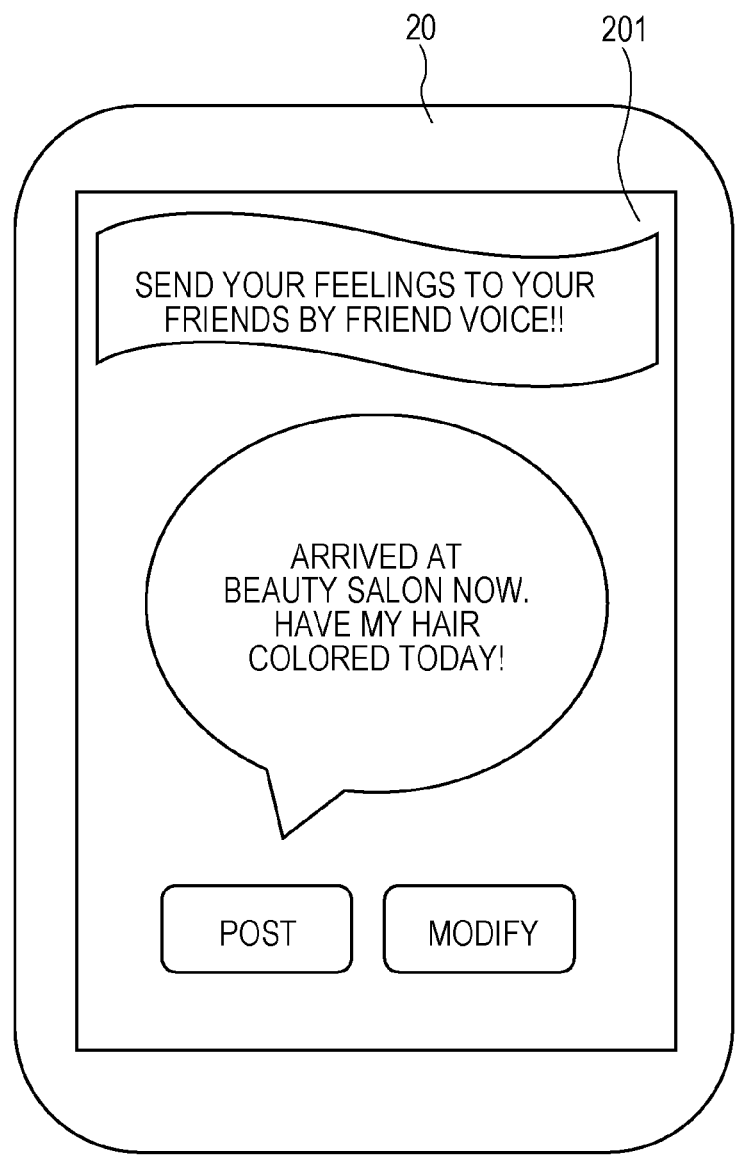
FIG. 10 is a diagram illustrating a posting screen (part 3) of the SNS application of the smart phone illustrated in FIG. 1.
Figure 11:
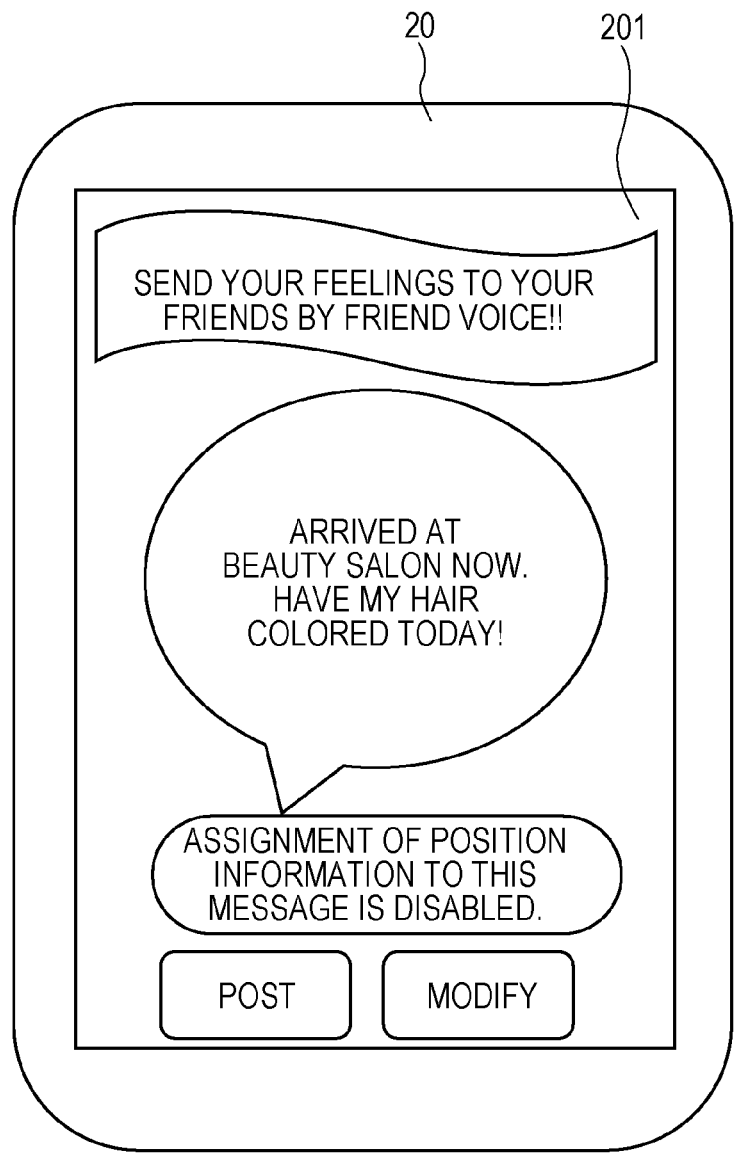
FIG. 11 is a diagram illustrating a posting screen (part 4) of the SNS application of the smart phone illustrated in FIG. 1.

On the other hand, when it is determined that the current position (the position of the smart phone 20 or the own vehicle) obtained in step S14 is not included in the second area (closest block) including the registration location obtained in step S15 (that is, when the determination is negative in step S16), the processing unit 11 determines whether the current position obtained in step S14 is included in the first area (neighboring block) which is a certain range outside the second area (in step S18: a first area determination unit). Thereafter, when it is determined that the current position (the position represented by the location information of the smart phone 20) obtained in step S14 is included in the first area (that is, when the determination is affirmative in step S18), the processing unit 11 transmits a geotag assignment banning control signal to the smart phone 20 (in step S19: the posting controller). More specifically, for example, when a position J1 represented by the location information of the smart phone 20 obtained in step S14 is included in the neighboring block (first block) of the registration location T1 illustrated in FIG. 12 (that is, when the determination is affirmative in step S18), the processing unit 11 transmits a geotag assignment banning control signal for banning assignment of location information to message information to be supplied to the SNS system to the smart phone 20. Thereafter, when the user inputs message information in the display unit 201 of the smart phone 20 as illustrated in FIG. 10, for example, a warning message representing that location information is not assigned to the message information is displayed in an upper portion of the posting button and the modification button as illustrated in FIG. 11. By this, the user may recognize that location information is not assigned to the message information.

Figure 13:
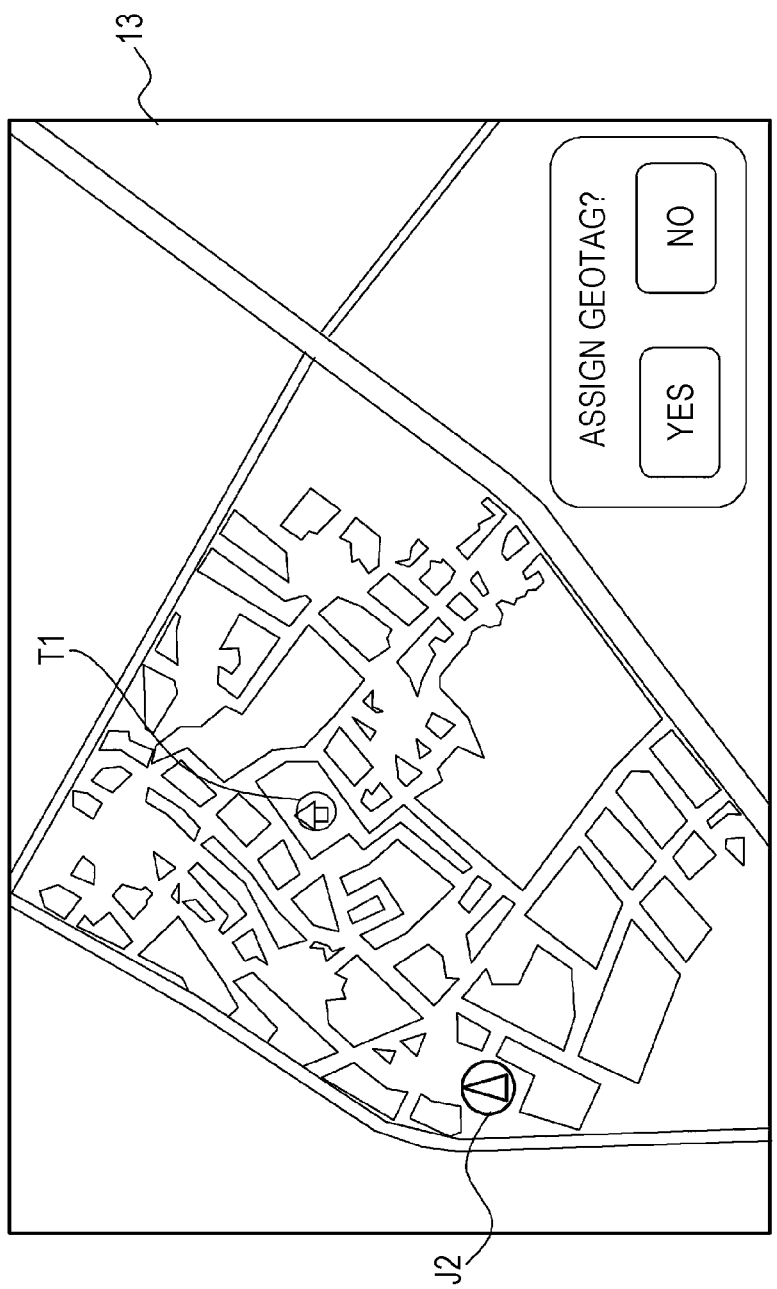
FIG. 13 is a diagram illustrating a geotag assignment selection message displayed in the display unit of the on-vehicle apparatus illustrated in FIG. 1.

Referring back to FIG. 3A, when it is determined that the current position (the position of the smart phone 20 or the own vehicle) obtained in step S14 is not included in the first area (neighboring block) (that is, when the determination is negative in step S18), the processing unit 11 further determines whether the current position obtained in step S14 is included in the third area (near block) which is a certain range outside the first area (in step S20: a third area determination unit). Thereafter, when it is determined that the current position (the position represented by the location information of the smart phone 20) obtained in step S14 is included in the third area (that is, when the determination is affirmative in step S20), the processing unit 11 displays a selection screen prompting a determination as to whether location information is to be assigned to message information to be transmitted to the SNS system in the display unit 13 (S21: a selection prompting unit). More specifically, for example, when a position J2 represented by the location information of the smart phone 20 obtained in step S14 is included in the near block (third area) of the registration location T1 as illustrated in FIG. 13 (that is, when the determination is affirmative in step S20), the processing unit 11 displays a message prompting a determination as to whether a geotag (location information) is to be assigned to the message information to be transmitted to the SNS system in a lower right portion in the display unit 13 as illustrated in FIG. 13 and displays the operation unit 12 (a YES button and a NO button) for the determination (in step S21).

In this way, when the user determines that a geotag is to be assigned to the message information by operating the operation unit 12 (that is, when the determination is affirmative in step S22), the processing unit 11 proceeds to the next process without transmitting any signal for controlling transmission of the message information and the location information assigned to the message information to the smart phone 20. On the other hand, when the user determines that a geotag is not to be assigned to the message information by operating the operation unit 12 (that is, when the determination is negative in step S22), the processing unit 11 proceeds to step S19 described above where the processing unit 11 transmits, to the smart phone 20, the geotag assignment banning control signal for banning assignment of location information to the message information to the SNS system (in step S19).

Figure 12:
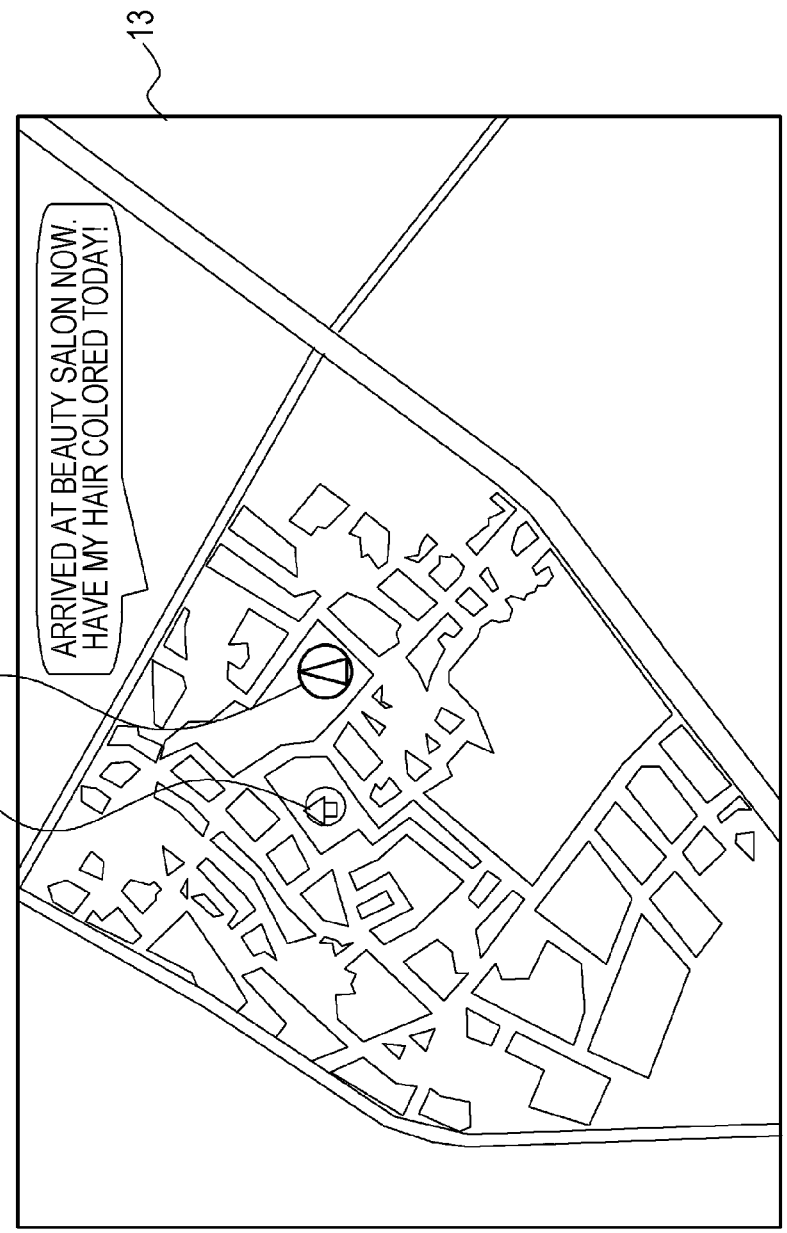
FIG. 12 illustrates a message posted by the smart phone illustrated in FIG. 1.

On the other hand, when it is determined that the current position (the position of the smart phone 20 or the own vehicle) obtained in step S14 is not included in the obtained third area (near block) in step S20 (that is, when the determination is negative in step S20), the processing unit 11 proceeds to the next process without transmitting any signal for controlling transmission of the message information and the location information assigned to the message information to the smart phone 20. Furthermore, in a case where the smart phone 20 posts message information to the SNS system before the processing unit 11 proceeds to the next process (that is, when the determination is affirmative in step S18, when the determination is affirmative in step S20, or when the determination is negative in step S20), the processing unit 11 may obtain the message information transmitted from the smart phone 20 and display the message information in the display unit 13. Specifically, as illustrated in FIG. 12, message information posted (transmitted) to the SNS system from the smart phone 20 is displayed in an upper portion in the display unit 13.

Thereafter, the processing unit 11 determines whether the smart phone 20 is connected to the on-vehicle apparatus 100 through the connector 19 (in step S23). When it is determined that the smart phone 20 is connected to the on-vehicle apparatus 100 through the connector 19 (that is, when the determination is affirmative in step S23), the processing unit 11 proceeds to step S14 and performs the above-described process (from step S14 to step S23) again. On the other hand, when it is determined that the smart phone 20 is not connected to the on-vehicle apparatus 100 through the connector 19 (that is, when the determination is negative in step S23), the processing unit 11 terminates the process. Note that, when it is determined that the smart phone 20 is in the geotag OFF state in step S13 described above (that is, when the determination is negative in step S13), the process is similarly terminated.

As described above, in a case where message information and location information assigned to the message information is posted (transmitted) to the SNS system (message management system) from the smart phone 20 connected to the on-vehicle apparatus 100, when a current position (a position of the own vehicle or the smart phone 20) is obtained by the GPS function, it is determined whether the obtained current position is included in the first area, the second area, or the third area (the first area determination unit, the second area determination unit, and the third area determination unit), and when it is determined that the current position is included in the second area, the smart phone 20 is banned from posting (transmitting) the message information and the location information (a geotag) assigned to the message information to the SNS system (the posting controller). Furthermore, when it is determined that the current position is included in the first area, posting (transmission) of the location information (a geotag) assigned to the message information to the SNS system is banned (the posting controller). Furthermore, when it is determined that the current position is included in the third area, the selection screen prompting a determination as to whether the location information (a geotag) is to be assigned to the message information to be transmitted to the SNS system (the message management system) is displayed in the display unit 13 of the on-vehicle apparatus 100 (the selection prompting unit). When the user determines that the location information is not to be assigned to the message information, posting (transmission) of the location information (a geotag) assigned to the message information to the SNS system is banned (the posting controller). Accordingly, when the message information and the location information are viewed by other terminal devices or the like, personal information readable from the message information and the location information (a geotag) to be viewed may be more reliably protected.

Figure 14:
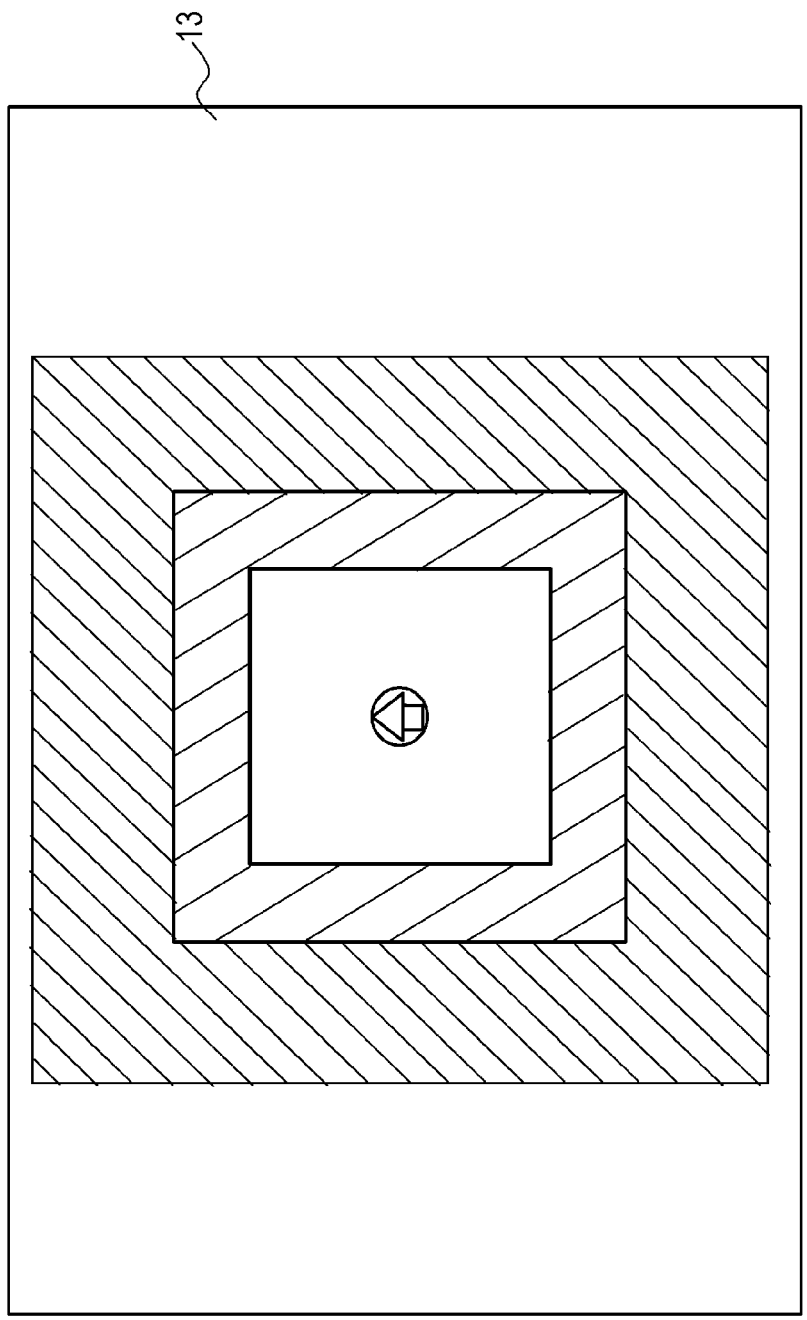
FIG. 14 is a diagram (part 2) illustrating a registration location and zoning displayed in the display unit of the on-vehicle apparatus.
Figure 15:
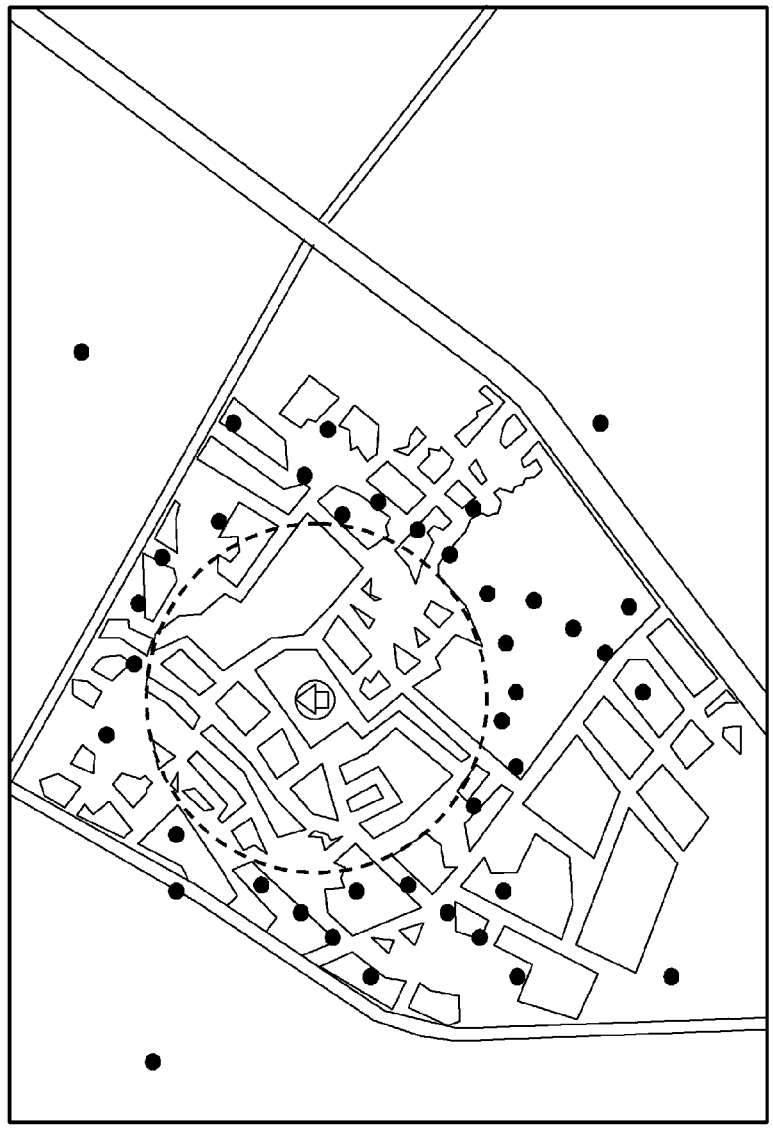
FIG. 15 is a diagram illustrating a location where a message is posted when posting of messages is banned only in an area within a predetermined radius from a registration location.

Furthermore, in the foregoing process, the shape of the second area is a circle including the registration location at the center. However, the shape is not limited to this and the second area may have a polygonal shape, a rectangular shape, or the like. Furthermore, the first and third areas are set by addresses in certain regions. However, as with the shape of the second area, the first and third areas may have a polygonal shape or a rectangular shape. Furthermore, the first to third areas may have the same shape (the areas may be defined by addresses), or may have different shapes. Accordingly, as illustrated in FIG. 14, a first area E2, a second area E1, and a third area E3 may be defined as areas having a rectangular shape as displayed in the display unit 13 of the on-vehicle apparatus 100. By this, as illustrated in FIG. 15, for example, the registration location (the position of the user's home, for example) is prevented from being estimated by others from the message information and history (black circles in FIG. 15) of the location information assigned to the message information which are transmitted to the SNS system.

Furthermore, different control processes are performed by the processing unit 11 on the smart phone 20 depending on the different areas. However, when only one area is set in advance and it is determined that the current position obtained in step S14 described above is included in the area, it may be determined that message information and location information assigned to the message information are not transmitted to the SNS system. Alternatively, a selection screen prompting a determination as to whether location information is to be assigned to the message information to be transmitted to the SNS system may be displayed in the display unit 13 of the on-vehicle apparatus 100, and only when the user determines that the location information is not to be assigned to the message information, posting (transmission) of the location information assigned to the message information to the SNS system may be banned.

Figure 16:
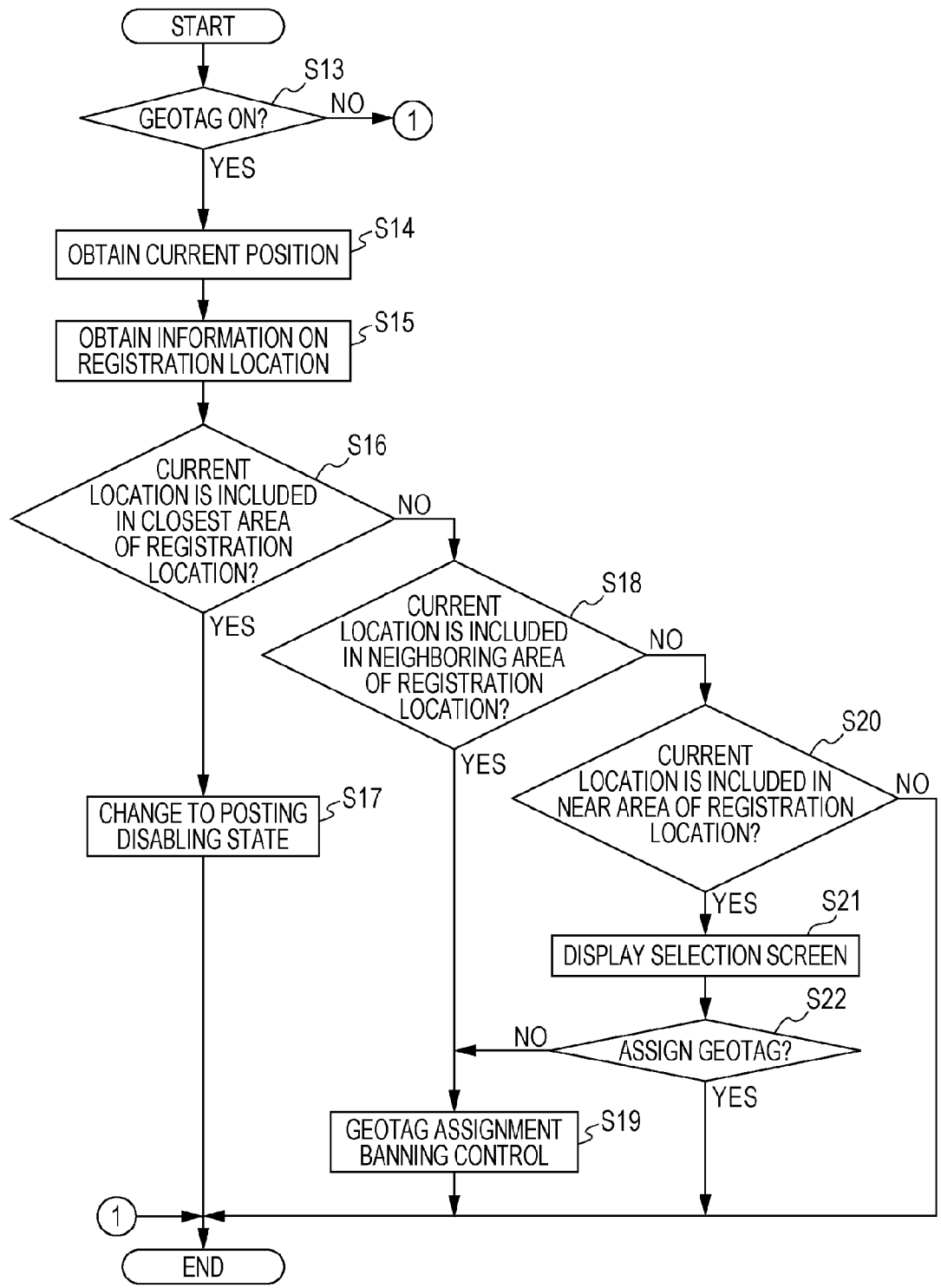
FIG. 16 is a flowchart illustrating a procedure of a process performed by an on-vehicle apparatus according to a second embodiment of the present invention.

FIG. 16 is a flowchart illustrating a procedure of a process of an on-vehicle apparatus according to a second embodiment of the present invention. This on-vehicle apparatus is obtained by installing, in the on-vehicle apparatus 100, an application which is used to transmit location information together with message information to an SNS system and which is installed in the smart phone 20 of the first embodiment of the present invention. Such an on-vehicle apparatus does not communicate with the smart phone 20 as illustrated in FIG. 16, and therefore, posting of message information and location information assigned to the message information to the SNS system may be more easily controlled. Note that processes in steps which are the same as those in the posting control process performed by the on-vehicle apparatus according to the first embodiment described above are basically denoted by step numbers the same as those of the posting control process.

As described above, according to the on-vehicle apparatus including the application for transmitting location information together with message information to the SNS system, before message information and location information assigned to the message information is intended to be posted (transmitted) to the SNS system (a message management system), a current position (a position of the own vehicle) is obtained by a GPS function, not shown, of a navigation unit 18 and it is determined whether the obtained current position is included in a first area, a second area, or a third area (a first area determination unit, a second area determination unit, a the third area determination unit). When it is determined that the current position is included in the second area, posting (transmission) of message information and location information (a geotag) assigned to the message information to the SNS system is banned (a posting controller). Furthermore, when it is determined that the current position is included in the first area, posting (transmission) of the location information (a geotag) to be assigned to the message information to the SNS system is banned (a posting controller). Furthermore, when it is determined that the current position is included in the third area, a selection screen prompting a determination as to whether the location information (a geotag) is to be assigned to the message information to be transmitted to the SNS system (message management system) is displayed in the display unit 13 of the on-vehicle apparatus 100 (the selection prompting unit). When the user determines that the location information is not to be assigned to the message information, posting (transmission) of the location information (a geotag) assigned to the message information to the SNS system is banned (the posting controller). Accordingly, when the message information and the location information are viewed by other terminal devices or the like, personal information readable from the message information and the location information (a geotag) to be viewed may be more reliably protected.

Note that the functions of the on-vehicle apparatus according to the second embodiment described above may be performed by a smart phone (a terminal device) including a navigation application.

As described above, the on-vehicle apparatus system, the on-vehicle apparatus, and the terminal device may reliably protect personal information readable from message information and location information when the message information and the location information are viewed. The present invention is efficiently applicable as an on-vehicle apparatus system which includes a terminal device including an application for transmitting message information to a message management system, such as an SNS system which provides SNS including Facebook® and Twitter®, which receives the message information from the terminal device through a predetermined network (the Internet, for example) and which allows other terminal devices to view the message information, and which includes an on-vehicle apparatus connected to the terminal device, and further relates to the on-vehicle apparatus and the terminal device.

Although preferred embodiments have been described in detail, the present invention is not limited to these specific embodiments. Rather, various modifications and changes can be made without departing from the scope of the present invention as described in the accompanying claims. Accordingly, all such modifications are intended to be included within the scope of this invention as defined in the following claims.

What is claimed is:

1. An on-vehicle apparatus connected to a terminal device having an application for transmitting to a message management system, location information representing a position of the terminal device together with message information comprising text of a communication intended for recipients of the message information, the message management system configured to receive the message information from the terminal device on a predetermined network and provide the received message information to other terminal devices, the on-vehicle apparatus comprising:

a processor configured to execute a plurality of units, the plurality of units comprising:
a first area determination unit configured to determine whether the position of the terminal device corresponding to the location information is included in a predetermined first area, the first area including a predetermined registration location;
a posting control unit configured to ban assignment of the location information before the message information is transmitted to the message management system to prevent others from estimating the registration location from the location information assigned to the message information, when the first area determination unit determines that the position of the terminal device is included in the first area;

a second area determination unit configured to determine whether the position of the terminal device corresponding to the location information is included in a second area, the second area included within the first area; and wherein the message information comprises text of a communication intended for recipients of the message information; and wherein the posting control unit bans transmission of the message information comprising text of the communication intended for recipients of the message information to prevent others from estimating the registration location from the message information, when it is determined that the position of the terminal device corresponding to the location information is included in the second area.

2. The on-vehicle apparatus according to claim 1, further comprising:

a third area determination unit configured to determine whether the position of the terminal device corresponding to the location information is included in a third area, the third area located outside the first area by a predetermined range; and a selection prompting unit configured to determine whether the location information is to be assigned to the message information before the message information is transmitted to the message management system, when the third area determination unit determines that the position of the terminal device corresponding to the location information is included in the third area;

wherein the posting controller bans, when it is determined that the location information is not to be assigned to the message information, assignment of the location information before the message information is transmitted to the message management system.

3. The on-vehicle apparatus according to claim 2, wherein the selection prompting unit includes a display controller configured to display, in a display unit of the on-vehicle apparatus, a selection screen configured to determine whether the location information is to be assigned to the message information before the message information is transmitted to the message management system, when the third determination unit determines that the position of the terminal device is included in the third area.

4. The on-vehicle apparatus according to claim 1, wherein the first area has a polygonal shape including a predetermined registration location.

5. The on-vehicle apparatus according to claim 1, wherein the first area has a circular shape including a predetermined registration location.

6. The on-vehicle apparatus according to claim 1, wherein the first area corresponds to addresses included in a predetermined region.

7. The on-vehicle apparatus according to claim 1, further comprising:

a vehicle position detector configured to detect a position of the vehicle; and wherein the position of the vehicle corresponds to the position of the terminal device represented by the location information.

8. An information transmission control method for transmitting to a message management system location information corresponding to a position of a terminal device, together with message information comprising text of a communication intended for recipients of the message information, the message management system configured to receive the message information from the terminal device on a predetermined network and provide the received message information to other terminal devices, the information transmission control method comprising:

determining whether the position of the terminal device represented by the location information is included in a predetermined first area, the first area including a predetermined registration location;

banning assignment of the location information before the message information is transmitted to the message management system by the application to prevent others from estimating the registration location from the location information assigned to the message information, when it is determined that the position of the terminal device is included in the first area in the first area determination step;

determining whether the position of the terminal device represented by the location information is included in a second area which is included in the first area, and which is narrower than the first area; and wherein the message information comprises text of a communication intended for recipients of the message; and wherein transmission of the message information comprising text of the communication intended for recipients of the message information is banned to prevent others from estimating the registration location from the message information when it is determined that the position of the terminal device represented by the location information is included in the second area.

9. The information transmission control method according to claim 8, further comprising:

determining whether the position of the terminal device represented by the location information is included in a third area, which is located outside the first area by a predetermined range; and determining whether the location information is to be assigned to the message information before the message information is transmitted to the message management system, when it is determined that the position of the terminal device represented by the location information is included in the third area; and wherein when it is determined that the location information is not to be assigned to the message information, assignment of the location information before transmission of the message information to the message management system is banned.

10. The information transmission control method according to claim 9, further including displaying, in a display unit of an on-vehicle apparatus, a selection screen used to determine whether the location information is to be assigned to the message information before the message information is transmitted to the message management system, when it is determined that the position of the terminal device is included in the third area.

11. The information transmission control method according to claim 8, wherein the first area has a polygonal shape including a predetermined registration location.

12. The information transmission control method according to claim 8, wherein the first area has a circular shape including a predetermined registration location.

13. The information transmission control method according to claim 8, wherein the first area corresponds to addresses included in a predetermined region.

14. The information transmission control method according to claim 8, further comprising:
   detecting a position of a vehicle; and
   wherein the position of the vehicle corresponds to the position of the terminal device represented by the location information.

15. A terminal device including an application for transmitting to a message management system, location information representing a position of the terminal device, together with message information comprising text of a communication intended for recipients of the message information, the message management system configured to receive the message information from the terminal device on a predetermined network and provide the received message information to other terminal devices, the terminal device comprising:
   a processor configured to execute a plurality of units, the plurality of units comprising:
   an area determination unit configured to determine whether the position of the terminal device corresponding to the location information is included in a first predetermined area, the first area including a predetermined registration location; and
   a posting control unit configured to ban assignment of the location information before the message information is transmitted to the message management system by the application to prevent others from estimating the registration location from the location information assigned to the message information, when the area determination unit determines that the position of the terminal device is included in the first predetermined area;
   a second area determination unit configured to determine whether the position of the terminal device corresponding to the location information is included in a second predetermined area, the second predetermined area included in the first predetermined area; and
   wherein the message information comprises text of a communication intended for recipients of the message; and
   wherein the posting control unit bans transmission of the message information comprising text of the communication intended for recipients of the message information to prevent others from estimating the registration location from the message information, when it is determined that the position of the terminal device corresponding to the location information is included in the second predetermined area.

* * * * *